United States Patent [19]
Kozyrski et al.

[11] Patent Number: 5,860,758
[45] Date of Patent: *Jan. 19, 1999

[54] SYSTEM AND METHOD FOR FRAME FASTENING

[75] Inventors: Vincent T. Kozyrski, Plainville, Conn.; William Hursey, Picayune, Miss.

[73] Assignee: The Fletcher-Terry Company, Farmington, Conn.

[ * ] Notice: The term of this patent shall not extend beyond the expiration date of Pat. No. 5,738,461.

[21] Appl. No.: 956,933

[22] Filed: Oct. 23, 1997

Related U.S. Application Data

[63] Continuation of Ser. No. 612,218, Mar. 7, 1996, Pat. No. 5,738,461.

[51] Int. Cl.$^6$ .............................. A47G 1/10; F16B 2/14
[52] U.S. Cl. ..................... 403/294; 403/292; 403/401; 144/353
[58] Field of Search ....................... 403/381, 292, 403/294, 401, 295; 144/353, 134.1, 136.1, 84, 371

[56] References Cited

U.S. PATENT DOCUMENTS

| | | | |
|---|---|---|---|
| 111,128 | 1/1871 | Linscott | 403/401 X |
| 497,915 | 5/1893 | Fulghum et al. | 403/294 |
| 1,089,360 | 3/1914 | Goodrow | 403/401 |
| 2,735,146 | 2/1956 | Purviance . | |
| 3,336,689 | 8/1967 | Miller . | |
| 3,425,721 | 2/1969 | Agee | 403/294 |
| 4,262,973 | 4/1981 | Grilli et al. . | |
| 4,593,734 | 6/1986 | Wallace . | |
| 4,632,589 | 12/1986 | Hsiu . | |
| 4,681,498 | 7/1987 | Raffoni | 403/294 X |
| 4,742,856 | 5/1988 | Hehr et al. . | |
| 5,090,835 | 2/1992 | Cox | 403/401 X |
| 5,149,236 | 9/1992 | Rapayelian . | |

FOREIGN PATENT DOCUMENTS

| | | | |
|---|---|---|---|
| 157437 | 1/1953 | Australia | 403/401 |
| 25225 | 11/1919 | Denmark | 403/401 |
| 4426750 | 2/1995 | Germany | 403/401 |
| 446610 | 5/1936 | United Kingdom | 403/401 |

OTHER PUBLICATIONS

Clamp Pin Flyer.

*Primary Examiner*—Anthony Knight
*Attorney, Agent, or Firm*—Ira S. Dorman

[57] ABSTRACT

A frame for pictures and the like is assembled from pieces that are routed to have divergent channels in mutual communication. The divergent paths produce increasing levels of force upon the parallel engagement portions of the fastening peg as it is inserted more deeply into the common recess, and thereby generate increasing levels of compressive force across the joint between the frame pieces.

20 Claims, 7 Drawing Sheets

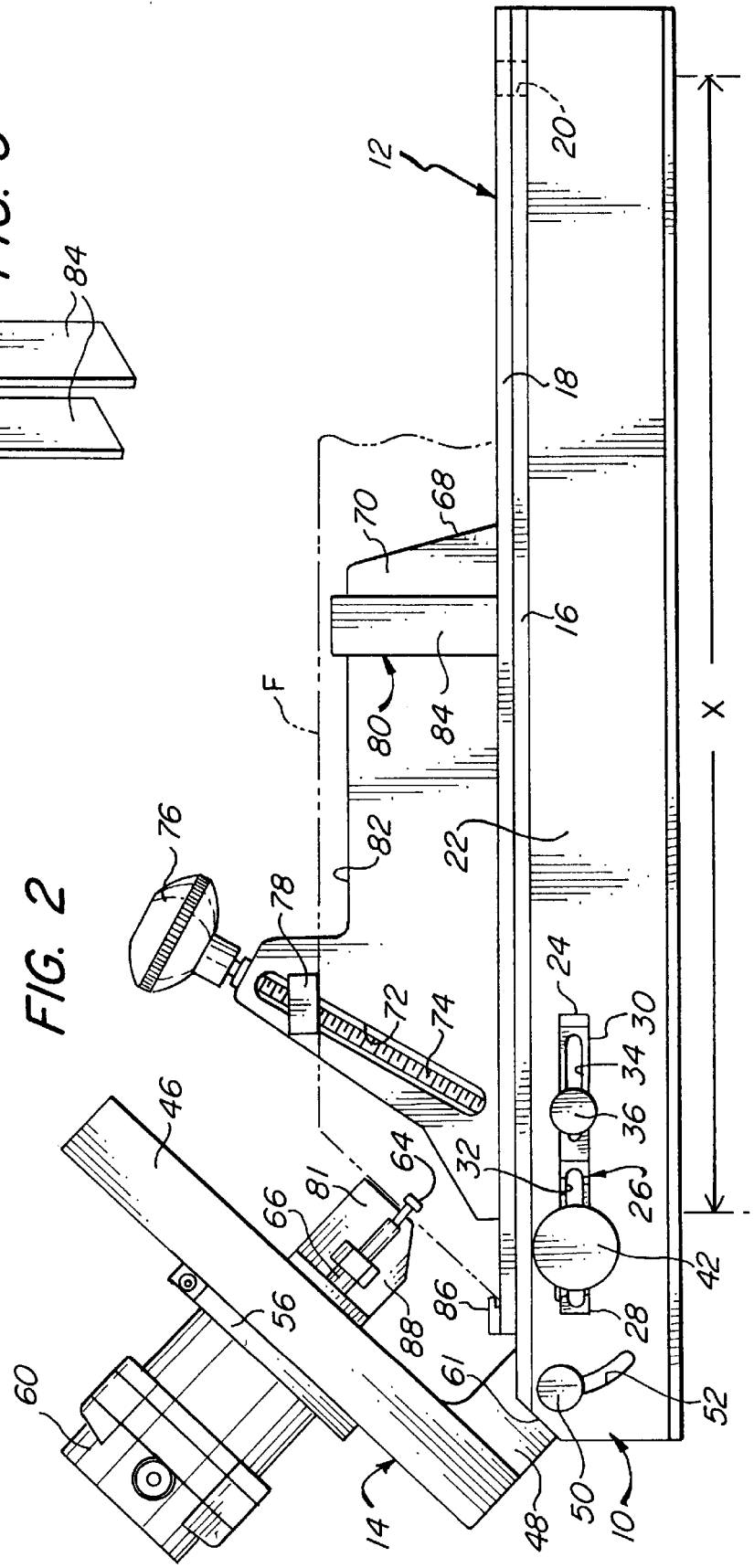
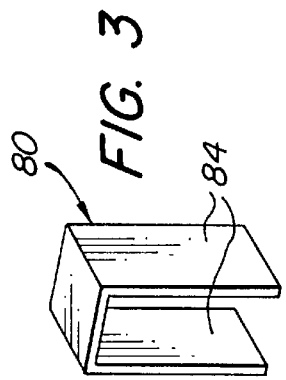

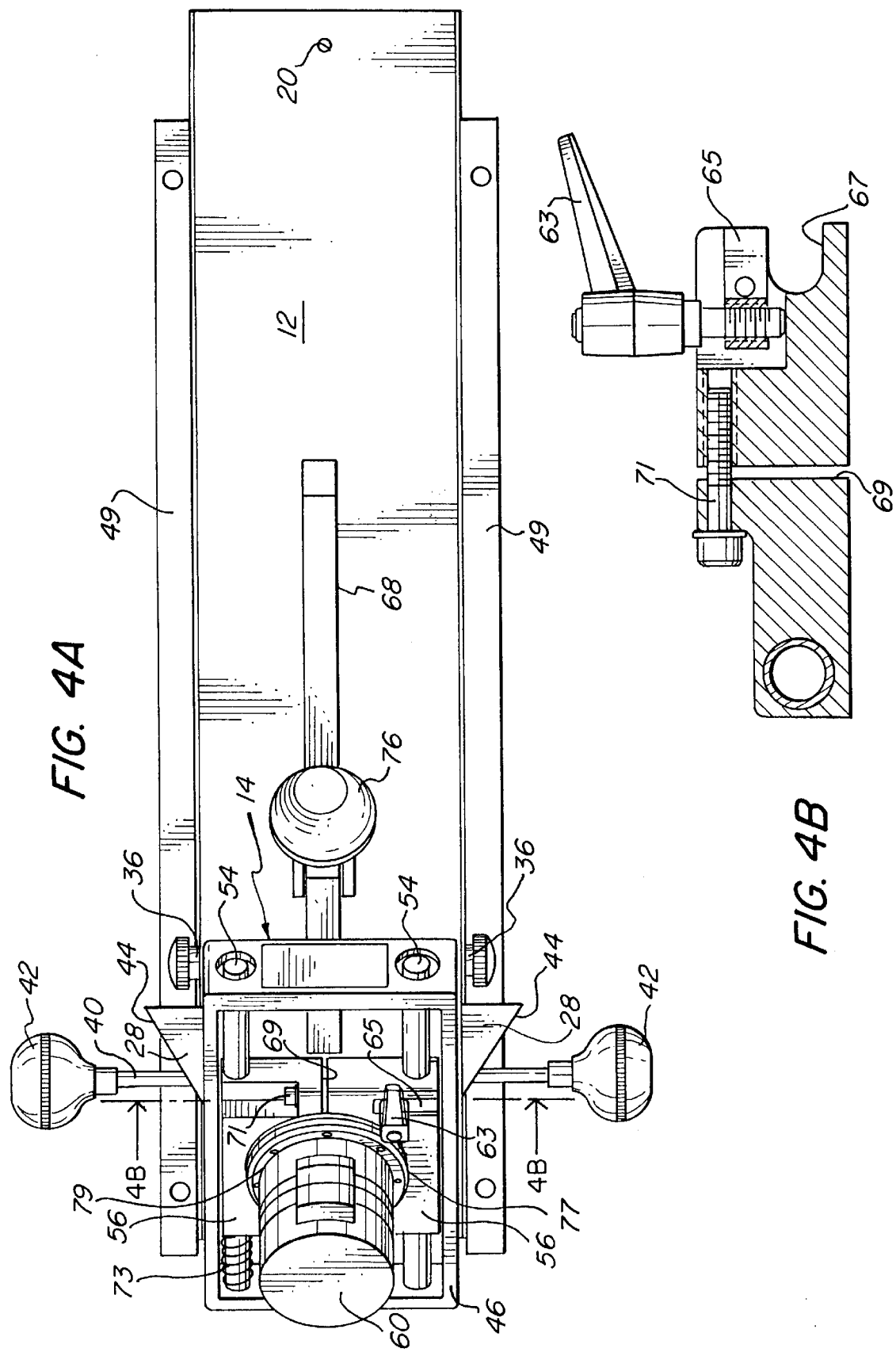

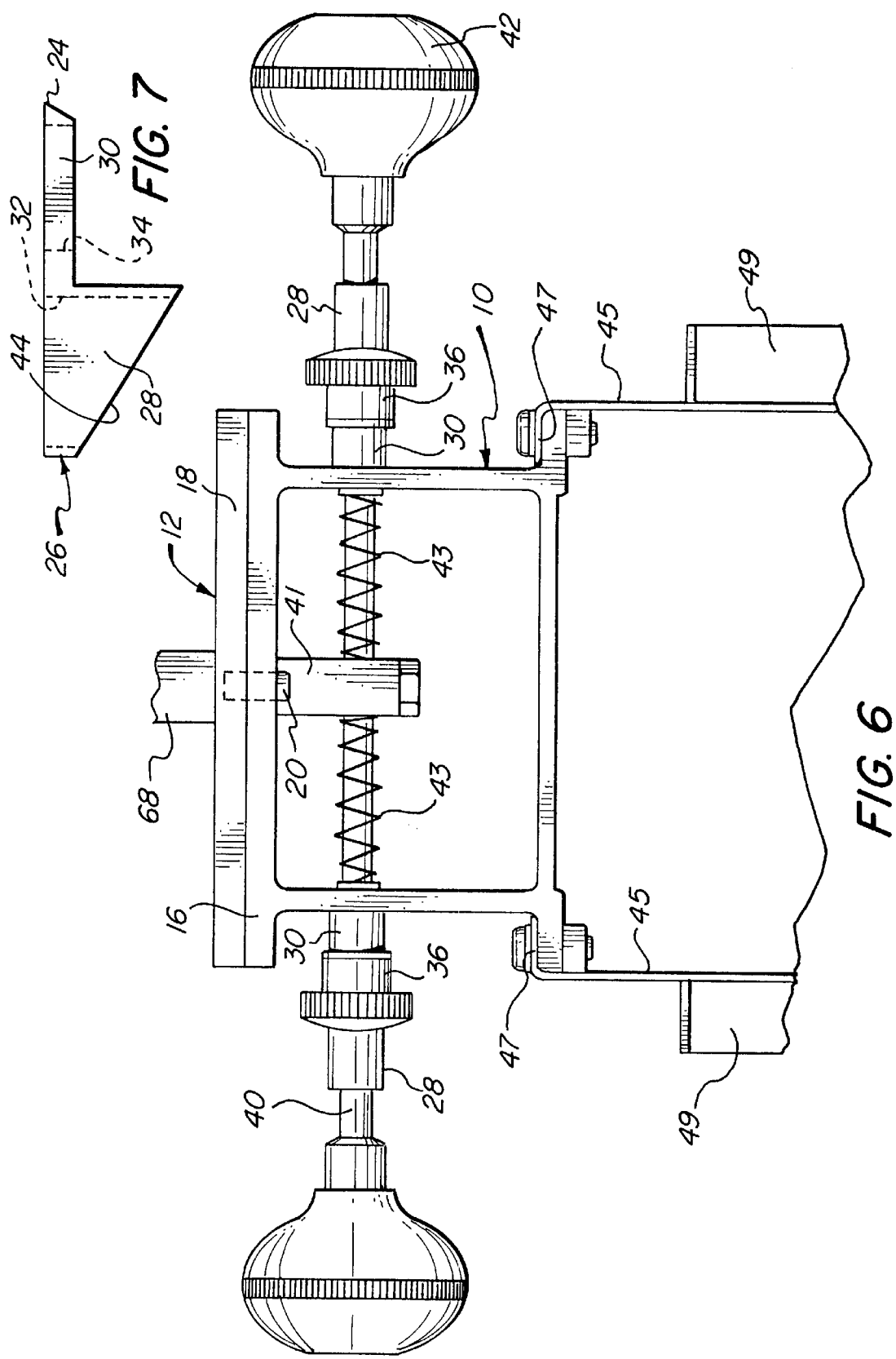

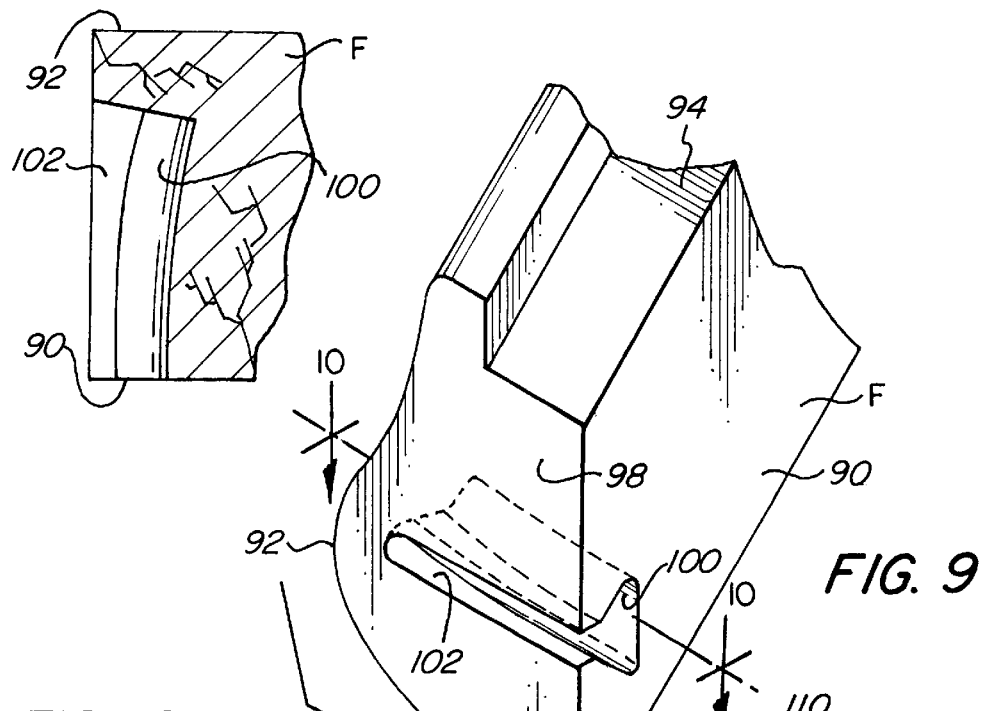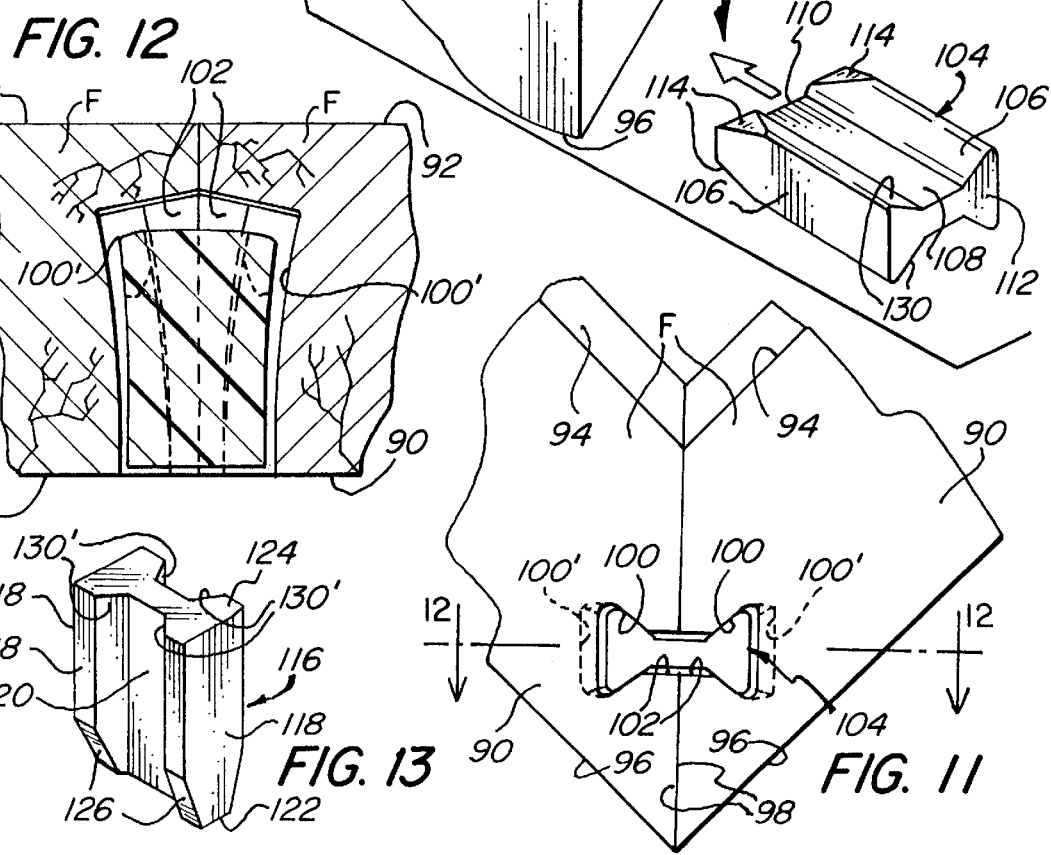

SYSTEM AND METHOD FOR FRAME FASTENING

This application is a continuation of application Ser. No. 08/612,218, filed Mar. 7, 1996 and now issued as U.S. Pat. No. 5,738,461.

BACKGROUND OF THE INVENTION

It is common practice to join component pieces for constructing picture frames and the like by inserting connecting pegs, wedges, or other fasteners into cooperating channels formed into contiguous end portions of the frame pieces. Exemplary of the prior art in this field are the following U.S. patents:

| | | | |
|---|---|---|---|
| Linscott | U.S. Pat. No. 111,128 | Snitzer et al | U.S. Pat. No. 4,290,371 |
| Fulghum et al | U.S. Pat. No. 497,915 | Logan | U.S. Pat. No. 4,438,578 |
| Lobo | U.S. Pat. No. 1,061,855 | Wallace | U.S. Pat. No. 4,493,583 |
| Cordes | U.S. Pat. No. 1,165,155 | Wright | U.S. Pat. No. 4,632,160 |
| Jensen | U.S. Pat. No. 1,537,678 | Wright | U.S. Pat. No. 4,715,415 |
| Scianna | U.S. Pat. No. 2,455,097 | Hehr et al | U.S. Pat. No. 4,742,856 |
| Purviance | U.S. Pat. No. 2,735,146 | Wright | U.S. Pat. No. 4,858,664 |
| Miller | U.S. Pat. No. 3,336,689 | Wright | U.S. Pat. No. 4,936,360 |
| Agee | U.S. Pat. No. 3,425,721 | Cox | U.S. Pat. No. 5,090,835 |
| Jungers et al | U.S. Pat. No. 4,142,342 | Rapayelian | U.S. Pat. No. 5,149,236 |
| Bowen et al | U.S. Pat. No. 4,275,972 | Cox Des. | U.S. Pat No. 309,985 |

In so constructing frames, it is a matter of fundamental concern to eliminate, or to at least minimize, the presence of gaps between adjacent frame pieces, which are unsightly and tend to compromise the strength of the frame. Numerous channel and fastener designs and structures have been proposed in an effort to achieve a tight and secure joint between frame members; nevertheless, the need has not been satisfied adequately.

SUMMARY OF THE INVENTION

Accordingly, it is a broad object of the present invention to provide a novel assembly comprised of frame pieces and a fastening peg, wherein the frame pieces are securely held together in a tight interrelationship and with little or no gap between them.

A related object of the invention is to provide such an assembly wherein the peg fastener employed is of relatively incomplex construction, and is capable of exerting high levels of closing force without itself being distorted or damaged.

It is also a broad object of the invention to provide a novel method for the assembly of a frame, such that the resultant assembly has the attributes hereinabove identified.

A more specific related object is to provide such a method wherein channels of unique character are formed, which channels cooperate in a highly effective manner with a peg fastener in producing a tight joint between frame pieces.

Another related object is to provide such a method which is relatively uncomplicated, facile, and convenient to employ.

It has now been found that certain of the foregoing and related objects of the invention are attained by the provision of a frame assembly comprising at least two elongate frame pieces assembled in a coplanar relationship to one another by a fastening peg. The frame pieces have generally planar end faces in mutual contact, and each has a length, from a proximal end to a distal end, a width from side to side, and a thickness from front to rear. An elongate channel formed in the proximal end of each such piece extends, from an entrance at a rear surface, in the thickness direction and substantially in a plane perpendicular to the end face. The channel is comprised of a relatively narrow slot portion, opening on the end face, and a groove portion spaced from the end face and extending, substantially in the perpendicular plane referred to, along a groove path both forwardly from the rear surface, in the thickness direction, and also away from the end face in the length direction of said frame piece. The groove portion of each channel is of enlarged cross section relative to the slot portion, taken in planes transverse to the groove path, and the slot portions of the channels of the two pieces are disposed in substantial registry with one another.

Securement of the frame pieces in such assembly is achieved by inserting the fastening peg into the mutually aligned channels. The peg has a lateral width, a transverse thickness, and a length, with trailing and leading ends at the top and bottom thereof, respectively. It is comprised of two lateral engagement portions extending lengthwise thereof, and an interconnecting panel portion between the engagement portions and dimensioned and configured to reside in the passageway formed by the mutually registered slot portions of the frame piece channels. The engagement portions of the peg are enlarged, relative to its panel portion, in planes that extend transversely and widthwise through the peg; they are dimensioned and configured for engagement in the groove portions of the channels, and they are separated from one another by a distance that is substantially constant along the length of the peg, which distance is substantially equal to the distance between the groove portions of the channels at the entrances thereto. Because of the increasing levels of lateral stress that are generated by the divergence of the groove paths as the peg is inserted more deeply into the frame piece channels, the panel portion of the peg usually extends at least substantially to its leading end (and desirably, fully thereto) so as to provide reinforcement against distortion and fracture.

In certain embodiments of the assembly, the groove paths will extend substantially curvilinearly in the frame piece, the curve usually having a single, constant radius; the radius will desirably be at least 17 inches in length, to afford adequate holding force without creating excessive resistance to cutting, and usually it will not be longer than 21 inches. The groove paths may alternatively extend substantially rectilinearly, and other path configurations that produce increasing spacing may be employed as well. Each of the channels will normally be symmetric about the perpendicular plane referred to.

In preferred embodiments of the assembly, the channels will be partially defined by shoulder portions on the frame pieces which diverge, in transverse planes, from the slot portion to the groove portion. The peg will correspondingly be formed with shoulder elements that diverge in the above-mentioned transverse, widthwise-extending planes, from opposite lateral edges on the opposite faces of the panel portion so as to bear upon the shoulder portions of the frame pieces. Each of the engagement portions of the peg may have a flat surface extending along its length on the opposite, transversely spaced sides thereof; the peg may alternatively have a bow tie-like configuration, taken in the transverse, widthwise-extending planes. In most instances the engagement portions of the peg will be substantially parallel to one another, and of generally columnar form. Surfaces on the engagement portions, adjacent the leading end of the peg, will advantageously be bevelled so as to provide lead-in elements thereat.

Other objects of the invention are attained by the provision of a method for the assembly of a frame, comprising the steps:

(a) providing at least two (normally elongate) frame pieces, each having the features previously described;

(b) forming a channel having the characteristics described in each of the frame pieces;

(c) disposing the frame pieces in generally coplanar relationship to one another with their end faces in mutual contact and with the slot portions of the channels thereof in substantial registry with one another;

(d) providing a fastening peg having the features previously described; and (e) introducing the peg into the channels of the so-disposed frame pieces and inserting it so as to effect assembly, the peg being subjected to increasing levels of lateral stress, due to the divergence of the groove portion paths, as it is inserted more deeply into the channels.

The method of the invention may include further step (f) of providing a machine having an element for cutting the channels in the frame pieces, step (b) being carried out by effecting relative movement of the cutting machine and the frame pieces, so oriented as to form the channels. In such embodiments the cutting path may be of arcuate contour, taken with reference to a center point that is spaced toward the distal ends of the frame pieces; the path may also be substantially rectilinear.

Further embodiments of the method include the additional steps of (g) providing support means for supporting at least one of the frame pieces, and (h) fixedly mounting the frame piece on the support means for carrying out step (b). Generally, both of the frame pieces will be simultaneously so mounted on the support means with the cutting element interposed between them, and the channels will be formed in a substantially continuous cycle of side-to-side relative movement to effect cutting of both frame pieces.

BRIEF DESCRIPTION OF THE DRAWINGS

FIG. 2 is a side elevational view of the cutting machine of FIG. 1;

FIG. 3 is a perspective view of a U-shaped implement used with the machine for imparting a forwardly convergent relationship to fame pieces supported thereon;

FIG. 4A is a plan view of a machine similar to that of FIG. 1, showing additional features, and FIG. 4B is a sectional view of the motor mounting block taken substantially along line 4B—4B of FIG. 4A;

FIG. 6 is a fragmentary rear elevational view of the same machine, drawn to the scale of FIG. 5;

FIG. 7 is a plan view of the cutting depth control member utilized in the machine of the foregoing figures;

FIG. 9 is an exploded perspective view showing one frame piece having a channel cut in a mitered end portion thereof, and a fastening peg positioned for insertion into the channel to effect assembly with another frame piece;

FIG. 10 is a fragmentary sectional view of the frame piece of FIG. 9, taken along line 10—10 thereof;

FIG. 11 is a view showing the rear of two frame pieces having channels of the character illustrated in FIGS. 9 and 10, held in assembly by a fastening peg inserted into the common recess cooperatively formed by the two aligned channels;

FIG. 12 is a fragmentary sectional view taken along line 12—12 of FIG. 11; and

FIG. 13 is a perspective view showing a second form of peg fastener suitable for use in frame assemblies embodying the invention.

DETAILED DESCRIPTION OF THE ILLUSTRATED EMBODIMENTS

Figure 1:
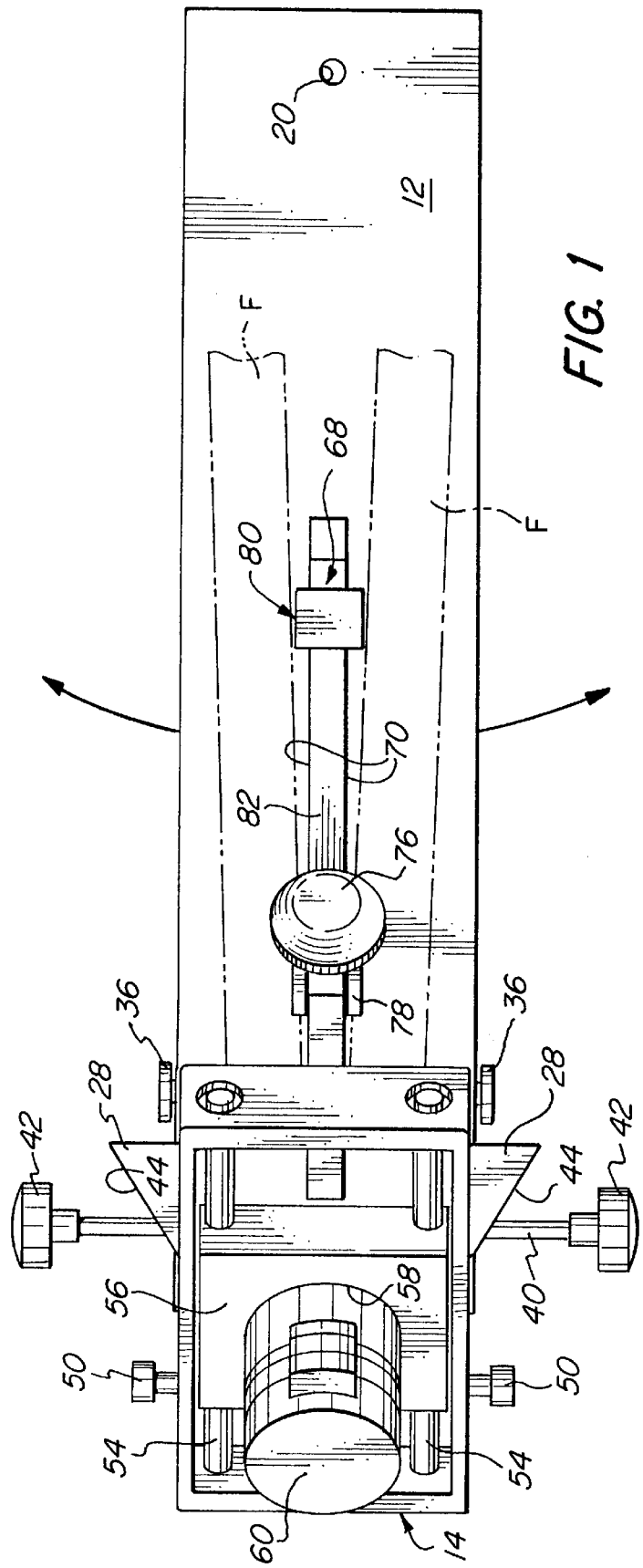
FIG. 1 is a plan view of a channel-cutting machine embodying the present invention.

Turning now in detail to FIGS. 1–7 of the appended drawings, therein illustrated is a cutting machine embodying the present invention and consisting of a base, a workpiece-supporting table, and a motor mount, generally designated respectively by the numerals 10, 12, and 14. The base 10 has a top wall 16 on which is slidably supported a plate 18 of which the table 12 is constructed, the wall 16 and plate 18 being interconnected (in the form depicted in FIGS. 1–5) by a pin 20 to pivot about a normally vertical axis on the centerline of the machine. The base 10 has opposite sidewalls 22 (only one of which is visible), against which is mounted a depth-control member, generally designated by the numeral 26 and best seen in FIG. 7. The member 26 consists of a wedge-like head element 28 and a rectilinear tail element 30, the elements 28 and 30 being slotted at 32 and 34, respectively. The threaded shaft of a knob-ended clamping screw 36 extends through the slot 34 of the tail element 30, into engagement with a threaded aperture formed in the corresponding wall 22, and serves to secure one of the depth control members 26 in any position along the length of the slot 34, as selected by alignment of the rearward edge 24 of the tail element 30 with an appropriate mark of the adjacent scale 38 (seen in FIG. 5); the scale markings will typically indicate depths of ⅜ inch, ⅝ inch and ¹⁵⁄₁₆ inch. An operating rod 40 is connected to the table 12 by an attached block 41, and has opposite end portions that extend through the slots 32 in the head elements 28 (appropriate apertures also being provided in the sidewalls 22); the end portions of the rod 40 terminate in operating knobs 42, and the block 41 is centered by coil springs 43 mounted on the rods (as seen in FIG. 6). As will be appreciated, the knobs 42 come into contact with the inclined faces 44 of the head elements 28 as the table 12 is swung in opposite directions about the pin 20, with the position of the members 26 thereby establishing the limits of travel of the table 12 and thus the depth of cutting (as will be more fully described below).

Figure 5:
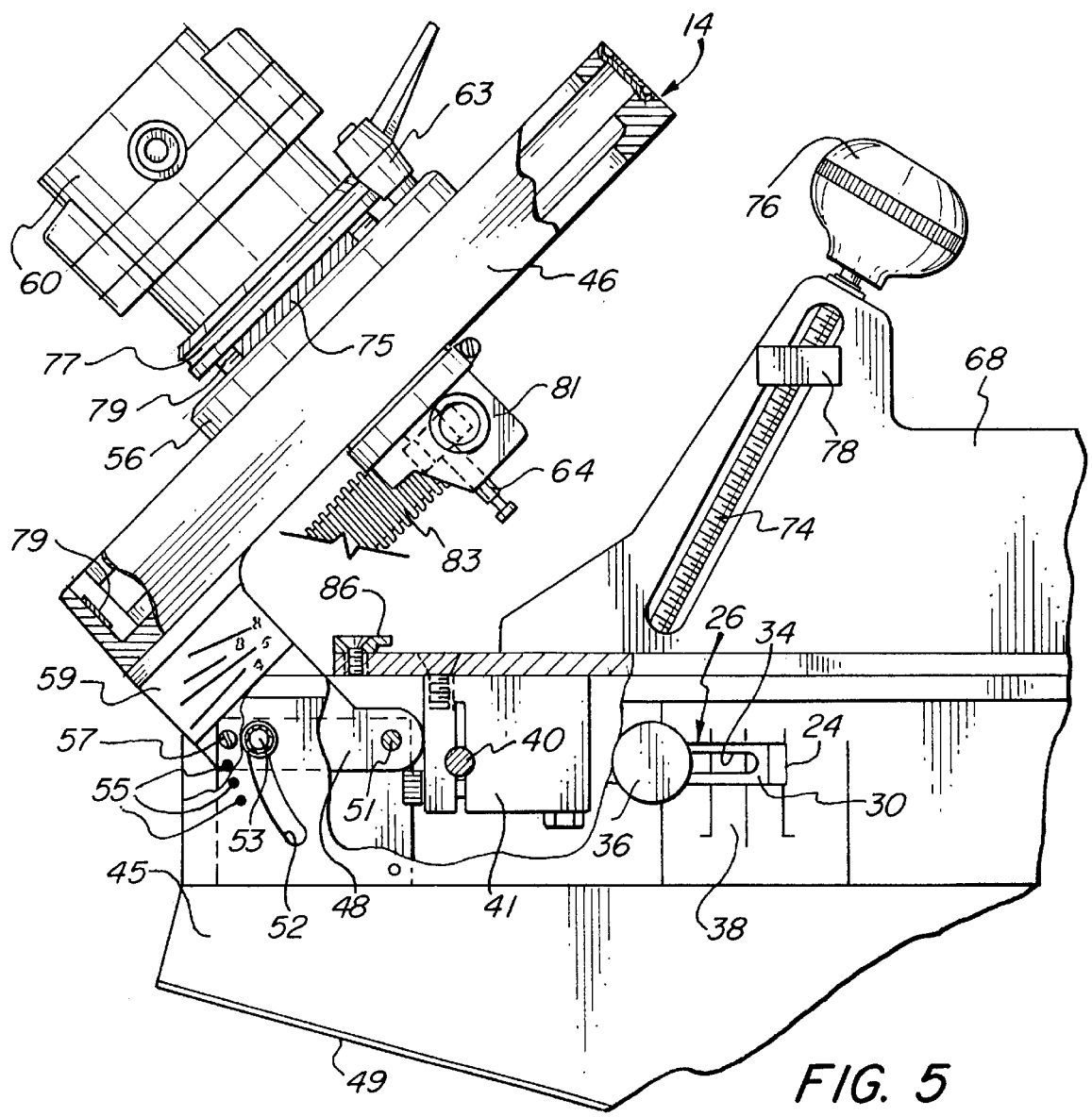
FIG. 5 is a fragmentary elevational view of the forward portion of the machine of FIG. 4A, drawn to an enlarged scale.

As is seen in FIGS. 4–6, supplemental support walls 45 may be attached to the opposite sides of the base 10 by means of upper flanges 47, the lower flanges 49 providing elements for direct support upon an underlying horizontal surface. The resultant ramp will impart a forward declination to the machine (generally at an angle of at least about 15° to horizontal), and will thereby facilitate and promote automatic positioning of frame pieces relative to the cutting bit. Fabricating the plate 18 from a smooth metal, such as anodized aluminum, will also contribute to the effect.

The motor mount 14 consists of a rectangular frame 46 from which extends a pair of connecting arms 48 (only one of which is again visible in FIGS. 2 and 5). The outer ends of the arms 48 are pivoted to the base 10 on shaft 51, and a fastening knob 50 has a threaded shaft 53 that extends into engagement with each arm 48 through the slot 52 in the respective sidewall 22. Tightening of the knobs 50 will serve to secure the mount in any angular position, pivoted about the axis of the shaft 51, within the limits of the arcuate slots 52.

A detent arrangement is desirably associated with the mounting arms, to indicate positions that are correct for cutting channels in end faces that have been mitered to produce common frame shapes, e.g., rectangular, pentangular, hexangular, and octangular. FIG. 5 shows a series of four detents 55 (only three of which are visible), which cooperate with a spring-loaded ball plunger, mounted at 57, to physically locate each of four positions of pivoting. A label 59 is applied to the arm 48, and corresponds to the detent locations to enable positioning for cutting pieces mitered to form 4-, 5-, 6-, and 8-sided frames, the lines on the scale being employed by reference to the base edge 61; further variation is possible between and beyond the detents.

A pair of guide rods 54 extend parallel to one another between the opposite ends of the frame 46, and slidably support a mounting block 56, the latter being fitted with a lever-operated clamping screw 63 and cooperating pivot lug 65 (seen in FIG. 4B) for disengageably securing it in any position along the length of the rods 54. As will be appreciated, turning of the screw 63, in the tightening direction, will cause the lug 65 to pivot into engagement with the one of the rods 54 that is received in the U-shaped slot 67; a coil spring 73 cushions impact of the block 56 against the bottom of the frame 46, upon release.

A router motor 60 extends through an aperture 58 in the block 56, which is split at 69 to provide opposing portions bridged by a transverse screw 71. A router bit 64 is in turn secured to the shaft 66 of the motor 60 for disposition in the plane (normally vertical) of the center line of the machine.

As will be appreciated, it is necessary to vary the position of the motor 60 along the axis of rotation so as to enable adjustment of the depth of penetration of the bit 64 in the direction normal to the bevelled face of the frame piece, for which purpose the elongate spacer 75, shown in FIG. 5, may be used. More specifically, the router (motor 60 and bit 64) can be displaced outwardly by loosening of the screw 71 to relieve the clamping force generated between the portions of the mounting block 56 defined by the split at 69. In that relationship, the spacer 75 can be inserted between the outer surface of the mounting block 56 and the ring 77, which is internally threaded and engaged on an externally threaded circumferential portion 79 of the motor housing. The ring 77 is turned so as to adjust the axial position of the router, as necessary to bring the tip of the bit 64 into contact with the bevelled face of the frame piece. After removal of the spacer, sliding the motor inwardly will position the bit so as to cut to a depth equal to the spacer width, whereupon the screw 71 will be tightened to maintain the desired relationship. A set of spacers, corresponding to standard depths of cutting, may of course be provided.

It will be noted that a magnetic element 79 is secured to the frame 46, for convenient storage of the spacer when it is not in use, and that a small hood or shield 81 surrounds the bit 64. A vacuum duct 83 is connected to the shield 81, which can therefore serve not only as a protective guard, for safety purposes, but also as means for concentrating the vacuum effect for efficient removal of sawdust and particles created during cutting operations.

Secured to the plate 18 of the table 12 is an upstanding wall, or fence structure 68, having (in the embodiment of FIGS. 1–6) parallel planar faces 70 on its opposite sides. A steeply inclined slot 72 is formed through the forward end portion of the wall 68, and receives the screw 74 of a clamping mechanism having an operating knob 76 accessible at its upper end. A rabbet clamping lug 78 has portions extending laterally outwardly beyond the opposite faces 70 of the wall 68, and has a central threaded aperture (not visible) by which it is engaged on the screw 74. Turning of the knob 78 will therefore raise and lower the lug 78, enabling it to clamp a pair of frame pieces "F" (shown in phantom line in FIGS. 1 and 2) against the upper surface of the plate 18 and with one piece "F" resting against each face 70 of the wall 68; normally, the back surfaces of the frame pieces will contact the faces 70 and the outside surfaces thereof will lie upon the plate 18. A stop element 86 is affixed at the forward end of the plate 18, and serves to engage the lower corners of both frame pieces under the lip that it provides. The lug 78 is elongated, to impart stability to the clamped frame piece, and it has a rib formed along its outer lower edge for enhanced engagement.

A U-shaped implement, generally designated by the numeral 80 and most fully shown in FIG. 3, may be mounted in inverted relationship over the top edge 82 of the wall 68 with its opposite legs 84 bearing upon the surfaces 70. As can be seen from FIG. 1, with the implement 80 in place the frame pieces "F" are caused to converge toward one another (and toward the plane on the center line of the machine) in the forward direction (i.e., toward the motor mount).

In preparation for cutting of channels in two frame pieces simultaneously, they are mounted, as depicted in FIGS. 1 and 2 and as described, against opposite sides of the wall 68 (and hence to opposite sides of the machine center line), with the router bit 64 disposed between them and with its axis substantially perpendicular to the bevelled surfaces of the end portions (as achieved by angular adjustment of the motor mount 14); the bit will also lie in a plane on the machine center line, which plane is perpendicular to the surface of the plate 18 and toward which plane the pieces "F" converge. Pivoting of the table 12 in opposite directions about the pin 20 (as indicated by the arrows in FIG. 1), with the router in operation, will cause the bit 64 to form channels in each of the frame pieces alternatingly, the channels following a curvilinear path due to the arcuate movement of the table; the radius "X" of the arc, indicated in FIG. 2, will preferably be at least 17 inches long and will not generally exceed 21 inches. The forward convergence of the frame pieces produced by the implement 80 will cause the depth variation in the channel formed to further increase, from the point of entry of the router bit into the frame piece.

Figure 8:
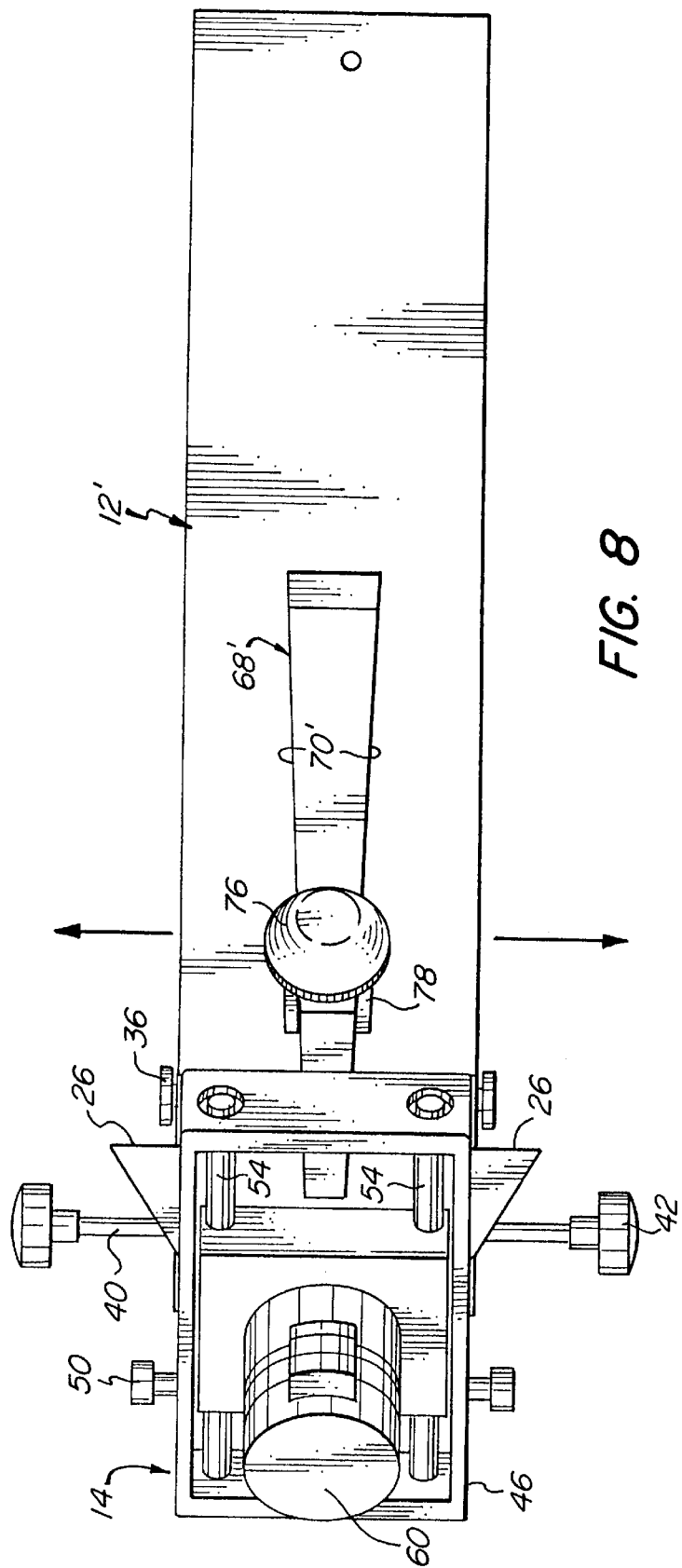
FIG. 8 is a view similar to FIG. 1, showing a modified form of the machine.

The machine illustrated in FIG. 8 of the drawings is virtually the same as that of the preceding Figures, except for the structure of the upstanding wall and for the manner of table movement. More particularly, the wall, generally designated the numeral 68', has lateral surfaces 70' which converge toward the center line of the machine and toward one another, in the forward direction. Consequently, frame pieces supported against the surfaces 70' will be disposed in a convergent relationship. As will be appreciated, the effect achieved is comparable to that which results from the presence of the implement 80 on the parallel-sided wall 68 of the previous embodiment, albeit that the angle of convergence can be changed by repositioning of the implement 80.

It should be emphasized that both the pivotable mounting of the table, and also the convergent disposition of the frame pieces, cause the channels cut in a frame piece to increase in depth as the cut proceeds. Consequently, objects of the invention can be achieved utilizing a machine having a rotating table on which the upstanding wall has unaltered, parallel surfaces. Alternatively, a cut of increasing depth can be produced by effecting relative rectilinear movement between the frame pieces and the router bit, on an axis perpendicular to the center line, with the frame pieces disposed in the convergent relationship described, as is suggested by the arrows in FIG. 8; suitable means for guiding rectilinear movement of the table 12' will be evident to those skilled in the art, and is not therefore shown in detail. It will also be appreciated that, irrespective of whether the relative movement is arcuate or rectilinear, it can be achieved by movement of either the supporting table or the router and its supporting structure, or both.

Turning now to FIGS. 9–12 in greater detail, the frame pieces "F" are characterized as having a rear surface 90, a front surface 92, an inside rabbet surface 94 and an outside surface 96; the thickness dimension is taken to be that which extends between the rear and front surfaces 90,92, and the width dimension is taken as that which extends between the surfaces 94 and 96. An end face 98 extends in a plane that is perpendicular to the rear surface 90, and at an angle of 45° to the outside surface 96 (and 135° to the inside surface 94). Each cut channel consists of a groove portion 100 and a connecting slot 102, extending in the thickness direction of the frame piece from a point of entry on the rear surface 90, the slot portion 102 additionally opening on the end face 98. The cut channel proceeds along a curvilinear path, which lies at progressively increasing distances from the end face 98 (i.e., in the length direction of the frame piece) as it extends in the thickness of the piece; such a curvilinear path would be produced by effecting relative pivotal or arcuate movement between the frame pieces and the cutting bit.

As depicted in FIG. 11, two frame pieces "F" are assembled with their end faces 98 in mutual contact, and with the pieces themselves in a generally coplanar relationship to one another. The channels formed in the end portions of the end pieces are aligned with one another, with the slot portions 102 thereof in substantial registry, cooperatively forming a recess into which may be inserted the fastening peg generally designated by the numeral 104, which is most fully illustrated in FIG. 9.

More particularly, the peg 104 consists of two lateral engagement portions 106, which extend parallel to one another, interconnected by a panel portion 108. It has a leading end 110, to which the panel portion extends fully, and a trailing end 112, the leading end portion having champfers at 114 to facilitate entry into the aligned channels.

Because of the divergence of the groove portions 100 (the innermost ends of which are designated 100' in FIGS. 11 and 12), increasing levels of compressive force are generated on the frame pieces, by the parallel engagement portions 106, as the peg is driven more deeply into the recess formed by the channels. This of course exerts an effective closing force at the joint between the frame pieces, and serves to eliminate, or at least reduce, any gap that might otherwise be present therebetween. Extending the panel portion 108 fully to the leading end of the peg provides reenforcement thereat and prevents fracture or distortion of the peg at the location where greatest strength is required.

A second form of peg, generally designated by the numeral 116 and highly suitable for use in the practice of the invention, is illustrated in FIG. 13. It is similar to peg 104 in having parallel engagement portions 118, a full-length connecting panel portion 120, a leading end and a trailing end 122 and 124, respectively, and champfered lead-in surfaces 126. It differs primarily in that the opposite transverse faces 128 of the engagement portions 118 are flat. The shoulder surfaces 130' are of course functionally equivalent to the surfaces 130 of the peg 104, in that they bear upon the tapered surfaces of which the channel groove portions 100 are comprised.

Thus, it can be seen that the present invention provides a novel assembly comprised of frame pieces and a fastening peg, wherein the frame pieces are securely held together in a tight interrelationship and with little or no gap between them. The peg fastener employed is of relatively incomplex construction, and is capable of exerting high levels of closing force without itself being distorted or damaged. The invention also provides a novel method for the assembly of a frame, such that the resultant assembly has the attributes hereinabove identified. In carrying out the method, channels of unique character are formed, which channels cooperate in a highly effective manner with a peg fastener in producing a tight joint between frame pieces. The method is relatively uncomplicated, facile, and convenient to employ.

Having thus described the invention, what is claimed is:

1. A frame assembly comprising at least two frame pieces assembled in a coplanar relationship to one another and having generally planar end faces in mutual contact, each of said frame pieces having a length from a proximal end to a distal end, a width from side to side, and a thickness from front to rear, and having, formed in the proximal end portion thereof, an elongate channel extending, from an entrance at a rear surface of said piece, in the thickness direction substantially in a plane perpendicular to said end face, said channel being comprised of a relatively narrow slot portion, opening on said end face, and a groove portion spaced from said end face and extending, substantially in said perpendicular plane, along a groove path that extends both forwardly from said rear surface, in the thickness direction, and also away from said end face in the length direction of said frame piece, whereby said groove paths of said assembled frame pieces diverge from one another, said groove portion being of enlarged cross section, relative to said slot portion, taken in planes transverse to said groove path, and being defined in part by a V-shaped tapered section which is formed by flat surfaces that mutually diverge, in said transverse planes, from said slot portion, said slot portions of said channels of said two pieces being disposed in substantial registry with one another; and a fastening peg inserted into said channels of said frame pieces and securing said frame pieces in such assembly, said peg having a length, with trailing and leading ends at the top and bottom thereof, respectively, and having a lateral width and a transverse thickness, said peg being comprised of two lateral engagement portions, extending lengthwise thereof, and an interconnecting panel portion between said engagement portions and dimensioned and configured to reside in the passageway formed by said mutually registered slot portions of said frame piece channels, said engagement portions of said peg being enlarged, relative to said panel portion, in planes that extend transversely and widthwise through said peg, and being dimensioned and configured for engagement in said groove portions of said channels, each of said engagement portions having a V-shaped shoulder section defined by flat surfaces that diverge mutually, in said transverse and widthwise extending planes, from said panel portion of said peg, the taper of said shoulder sections of said engagement portions of said peg matching the taper of said tapered sections of said groove portions of said channels, said engagement portions being separated from one another by a distance that is substantially constant along the length of said peg and that is substantially equal to the distance between said groove portions of said channels at said entrances thereto, said peg being inserted into said frame piece channels with said shoulder sections of said peg bearing upon said tapered sections of said channels.

2. The assembly of claim 1 wherein said groove paths extend substantially curvilinearly.

3. The assembly of claim 2 wherein said groove paths extend with a single, constant radius.

4. The assembly of claim 1 wherein each of said channels is symmetric about said perpendicular plane.

5. The assembly of claim 1 wherein each of said engagement portions of said peg has a flat surface extending along its length on the opposite, transversely spaced sides of said engagement portion.

6. The assembly of claim 1 wherein said peg has a bow tie-like configuration, taken in said transverse, widthwise extending planes.

7. The assembly of claim 1 wherein said engagement portions of said peg are substantially parallel to one another and of generally columnar form, surfaces of said engagement portions adjacent said leading end being bevelled to provide lead-in elements thereat.

8. The assembly of claim 1 wherein said frame pieces are so disposed as to form a corner angle.

9. A method for the assembly of a frame, comprising the steps:

(a) providing at least two frame pieces, each having a length from a proximal end to a distal end, a width from side to side, a thickness from front to rear, and a planar end face at said proximal end;

(b) forming an elongate channel in each of said frame pieces extending, from an entrance at a rear surface of said piece, in the thickness direction substantially in a plane perpendicular to said end face, said channel being comprised of a relatively narrow slot portion, opening on said end face, and a groove portion spaced from said end face and extending, substantially in said perpendicular plane, along a groove path that extends both forwardly from said rear surface, in the thickness direction, and also away from said end face in the length direction of said frame piece, whereby said groove paths of said assembled frame pieces diverge from one another, said groove portion being of enlarged cross section, relative to said slot portion, taken in planes transverse to said groove path and being defined in part by a V-shaped tapered section which is formed by flat surfaces that mutually diverge, in said transverse planes, from said slot portion;

(c) disposing said frame pieces in coplanar relationship to one another, with said end faces thereof in mutual contact and with said slot portions of said channels thereof in substantial registry with one another;

(d) providing a fastening peg having a length, with trailing and leading ends at the top and bottom thereof, respectively, and having a lateral width and a transverse thickness, said peg being comprised of two lateral engagement portions, extending lengthwise thereof, and an interconnecting panel portion between said engagement portions and dimensioned and configured to reside in the passageway formed by said mutually registered slot portions of said channels of said frame pieces so disposed, said engagement portions of said peg being enlarged, relative to said panel portion, in planes that extend transversely and widthwise through said peg, and being dimensioned and configured for engagement in said groove portions of said channels, each of said engagement portions having a V-shaped shoulder section defined by flat surfaces that diverge mutually, in said transverse and widthwise extending planes, from said panel portion of said peg, the taper of said shoulder sections of said engagement portions of said peg matching the taper of said tapered sections of said groove portions of said channels, said engagement portions being separated from one another by a distance that is substantially constant along the length of said peg and that is substantially equal to the distance between said groove portions of said channels at said entrances thereto on said rear surfaces of said frame pieces so disposed, and (e) introducing said peg into said channels of said so disposed frame pieces, at said entrances thereto, and inserting said peg so as to assemble said frame pieces, said peg being subjected to increasing levels of lateral stress, due to the divergence of said groove paths, as said peg is inserted more deeply into said frame piece channels with said shoulder sections of said peg bearing upon said tapered sections of said channels.

10. The method of claim 9 wherein said paths of said groove portions are formed in said step (b) to extend substantially curvilinearly.

11. The method of claim 10 wherein said groove paths extend with a single, constant radius.

12. The method of claim 9 wherein each of said channels is formed in said step (b) to be symmetric about said perpendicular plane.

13. The method of claim 9 wherein each of said engagement portions of said peg has a flat surface extending along its length on the opposite, transversely spaced sides of said engagement portion.

14. The method of claim 9 wherein said peg has a bow tie-like configuration, taken in said transverse, widthwise extending planes.

15. The method of claim 9 wherein said engagement portions of said peg are substantially parallel to one another and of generally columnar form, surfaces of said engagement portions at said leading end being bevelled to provide lead-in elements thereat.

16. The method of claim 15 including the further step of (f) providing a cutting machine having a cutting element for cutting said channels in said frame pieces; wherein said step (b) is carried out by effecting relative movement of said cutting machine and said frame pieces, said frame pieces being so oriented, relative to said cutting element, as to form said channels.

17. The method of claim 16 wherein said cutting path is of arcuate contour, the arc of said contour having a center spaced toward said distal ends of said frame pieces from said proximal ends thereof.

18. The method of claim 16 wherein said cutting path is substantially rectilinear.

19. The method of claim 16 including the further steps of:

(g) providing support means for supporting at least one of said frame pieces; and (h) fixedly mounting said at least one frame piece on said support means, said step (b) being carried out with said at least one frame piece so mounted on said support means.

20. The method of claim 19 wherein, in said step (h), both of said frame pieces are simultaneously so mounted on said support means with said cutting element interposed therebetween, and wherein said channels are formed in a substantially continuous cycle of relative movement of said cutting machine and frame pieces to effect cutting of both of said frame pieces.

* * * * *